Dec. 14, 1954  M. WIENAND  2,696,640
EXTRUSION DEVICE

Filed Jan. 16, 1952  3 Sheets-Sheet 1

INVENTOR
Michael Wienand
BY

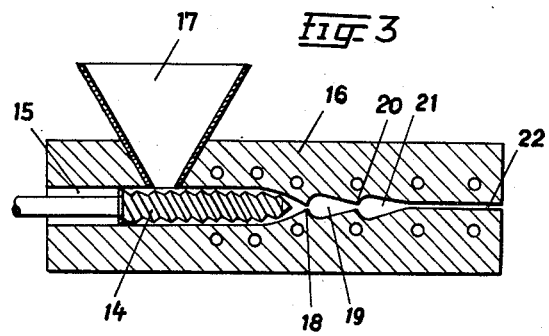
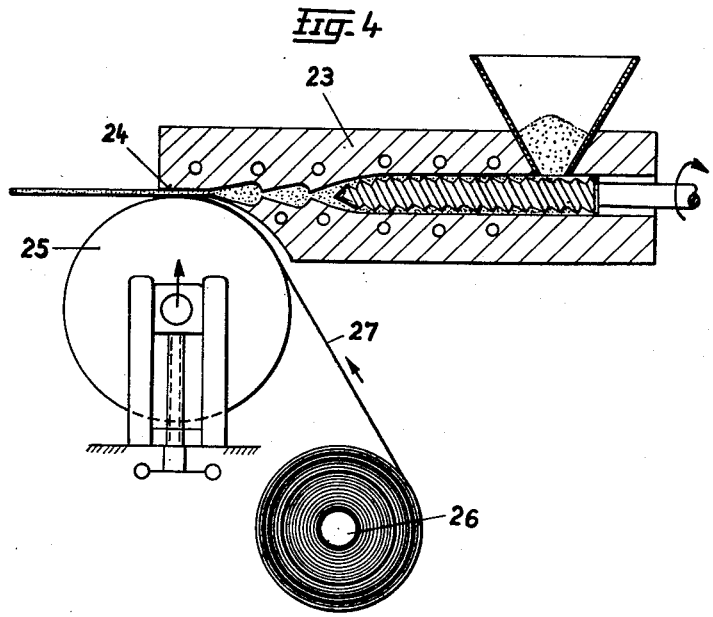

Dec. 14, 1954
M. WIENAND
2,696,640
EXTRUSION DEVICE
Filed Jan. 16, 1952
3 Sheets-Sheet 3
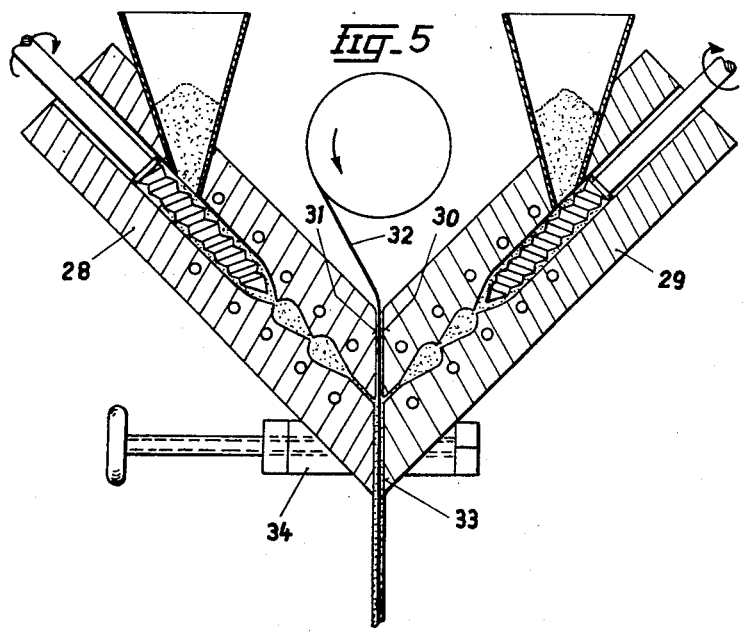
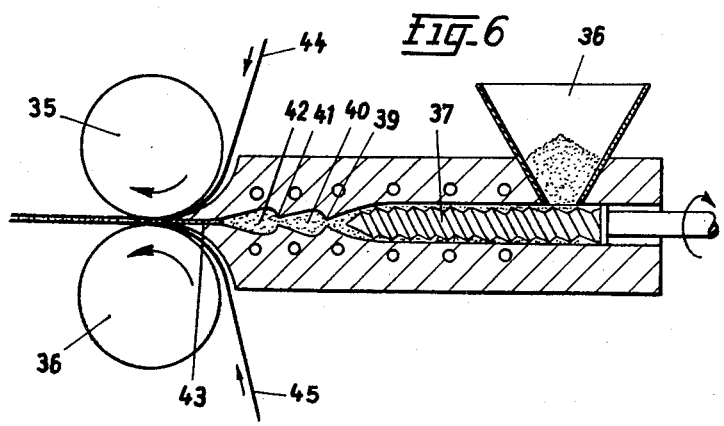
INVENTOR
Michael Wienand
BY

United States Patent Office 2,696,640
Patented Dec. 14, 1954

2,696,640
EXTRUSION DEVICE

Michael Wienand, Siegburg, district of Koln, Germany, assignor to Dynamit Actien-Gesellschaft vormals Alfred Nobel & Co., Troisdorf, Germany Application January 16, 1952, Serial No. 266,644

Claims priority, application Germany January 20, 1951

4 Claims. (Cl. 18—12)

This invention relates to an arrangement for the continuous production of endless foils or strips of preferably thermoplastic materials, especially thermoplastic synthetic materials, comprising if desired webs of fabric or other interlayers, using extrusion or worm presses or the like.

It is known to work up thermoplastic synthetic materials and natural materials into the form of foils in calenders, the starting materials being fed into the cylinder gap after having been plasticised in kneading machines or worm presses. However, this method necessitates large machines, such for example as three-cylinder calenders, and therefore involves considerable installation costs, while in addition it is difficult to draw foils of more than 0.8 mm. in thickness, so that thicker foils have hitherto had to be made in laminated form. It is an object of the present invention to produce such thicker foils in one operation.

Moreover, it is also known to work up the material, after it has been mixed and plasticised in kneaders, in piston extrusion presses to form tubes, rods or other shaped articles of small length or thickness. Worm presses are also employed for the same purpose, in which case an additional mixing and plasticisation is effected by the worm. Tubular articles have also been extruded by means of such machines by attaching thereto a suitable nozzle having an annular outlet, the said tubular articles then being opened out to form foils. However, only foils of limited width and thickness can be produced with such arrangements, while in addition stresses are set up in the material when the tube is stretched out to form the foil, and such stresses are difficult to remove.

The present invention aims at providing means of producing foils and webs of thermoplastic synthetic materials of any desired thickness and width in a particularly economical and simple manner by which the starting material, treated in kneading and mixing members arranged in juxtaposition to one another in a plane or in a circle or in another manner and connected to one another at the outlet apertures, is fed to one or more mixing and pressure-equalising chambers arranged one behind the other, if necessary with simultaneous heating, and issues from a common slot-like nozzle thereof in the form of a thin flat product. A large number of suitable plasticisers, such for example as extrusion presses, are arranged in juxtaposition which act in common on mixing and pressure-equalising chambers connected in front thereof, in which the starting material is further heated if desired.

In addition, foils, plates, bars or the like of variegated colours can be produced by introducing differently coloured starting materials into the various extrusion or worm presses.

The present invention also permits a very thorough working-up of the starting material, which can therefore be introduced into the kneading and mixing member without having been previously plasticised. The finished thin, flat product is then obtained at the slot-like outlet aperture or nozzle in the form of strips or foils, bars or other shaped articles, the thickness of which can be varied in any desired manner by adjustment of the slot width.

The invention also consists in an arrangement which comprises two or more extrusion presses having driving cranks offset at an angle of 90° or 120° with respect to one another, which presses are arranged in juxtaposition with their slot-like apertures leading into a common mixing and pressure-equalising chamber, which may be heatable if desired and having an outlet slot extending over the entire width. The staggering of the pistons with respect to one another enables the second piston to force the starting material back through the nozzle into the piston chamber of the first piston in the time during which the said first piston is taking up new starting material, from which piston chamber the material is then pressed towards the slot-like aperture with a reversal of the piston movement, so that a part of the starting material then passes from the first piston chamber into the second piston chamber.

In accordance with a further feature of the arrangement according to the invention, it is possible to provide instead of extrusion piston presses two or more juxtaposed worm presses, the slot-like outlet apertures of which lead into a common mixing and pressure-equalising chamber, which may be heatable, with an outlet slot extending over the entire width. Any pressure differences caused by unequal charging of the worms are compensated for by these chambers.

In order to improve the mixing action, it is possible in accordance with a still further feature of the invention to employ two or more mixing and pressure-equalising chambers communicating with one another through nozzles, which may be heatable, the said chambers being arranged one behind the other in order to ensure a thorough intimate mixing of the plasticised material.

In accordance with a further advantageous development of the invention, one of the boundary surfaces of the elongated nozzle is constituted by a cylinder over which a carrier substance, such as a web of wool, cellulose, paper, linen or metal fibres and mixtures of such fibres, is passed. Due to the pressure obtaining in the outlet area, the plastic material is pressed firmly on to the web of fabric, which is thus combined in any desired thickness with the plastic material, such as a synthetic material. Such composite materials are of great value for many purposes, whether for strengthening the portion of synthetic material or for protecting the fabric portion from moisture.

The arrangement may in accordance with the invention be further improved for many purposes by constituting the two boundary surfaces of the outlet slot by opposing cylinders, a web of textile material being passed over each cylinder and between the two. Thus, for example, in the product thus obtained two webs of carrier material are stuck together by a web of synthetic material of any desired thickness.

Finally, the arrangement according to the invention may be modified by arranging two pressing devices with equalising chambers at an angle to one another, so that the inclined end faces form a common outlet slot, between the boundary surfaces of which, for example, a web of textile material is passed. In this case, therefore, a web of carrier material is lined on each side with a plastic mass.

A number of embodiments of arrangements for carrying out the process according to the invention are illustrated by way of example in the accompanying drawings, to which reference is now made, and in which:

Figure 3 is a vertical longitudinal section through a worm press comprising a number of juxtaposed worms;

Figure 4 is a vertical longitudinal section through a worm press in which one side of the outlet slot is bounded by a cylinder;

Figure 5 is a vertical longitudinal section through an arrangement of two worm presses mounted at an angle to one another; and Figure 6 is a vertical longitudinal section through a worm press in which both sides of the outlet slot are bounded by a cylinder.

Figure 1:
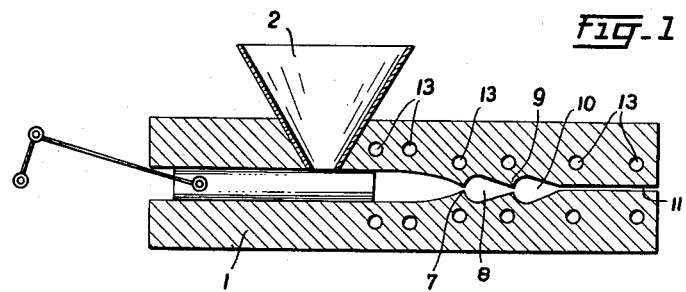
Figure 1 shows a vertical longitudinal section through an extrusion press comprising a number of juxtaposed cylindrical chambers.
Figure 2:
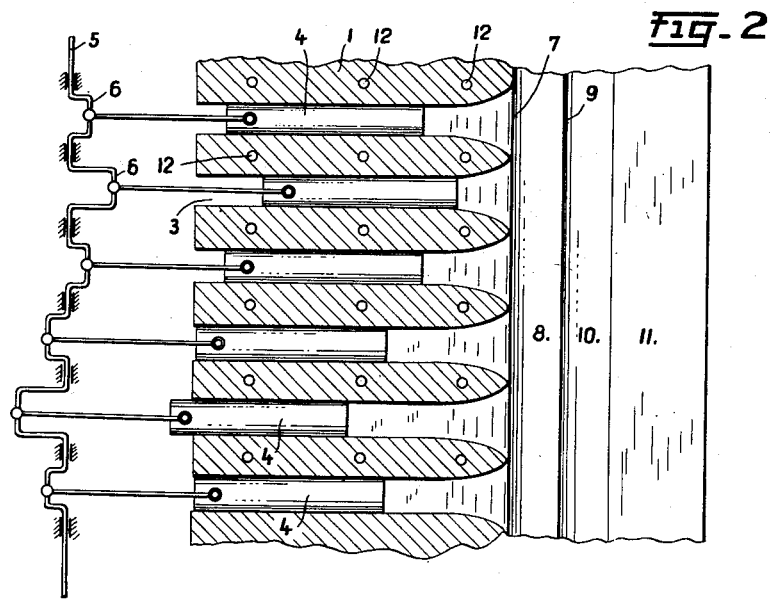
Figure 2 is a cross-section through the extrusion press shown in Figure 1.

The arrangement shown in Figures 1 and 2 comprises a block 1 and a charging hopper 2, in which block bores 3 are formed for the pistons 4. The pistons are driven by a crank shaft 5, the cranks 6 of which are staggered by 120° with respect to one another, so that each of the six pistons occupies a different position from the next piston. The working chambers formed by the bores 3 are narrowed at the outlet end to form a slot-like nozzle 7, which leads into a first mixing-and-pressure-equalizing chamber 8. The material passes from this chamber through a further slot-like nozzle 9 into a second mixing and pressure-equalising chamber 10, which is adjoined by a slot-like outlet aperture 11. The nozzles 7 combine to form a gap which extends over the entire width of the arrangement and is only interrupted by narrow bridges of material. The nozzle 9 and the outlet nozzle 11 on the other hand extend without interruption over the entire width of the pressing arrangement. This pressing arrangement is held together by screwthreaded bolts 12, and has in the region of the mixing and pressure-equalising chamber and of the inlet and outlet slots leading to these chambers, bores 13 through which a heating or cooling medium may be passed if required.

The arrangement shown in Figure 3 comprises a worm 14 rotatably arranged in a bore 15 in a press body 16. The starting material, for example in unplasticised form, is passed through a charging hopper 17 and taken up by the worm blades, mixed and kneaded, and then passed from the worm chamber through a slot-like nozzlze 18 into a mixing chamber 19, from which it passes through a slot-like nozzle 20 into a further mixing chamber 21, from which the completely kneaded material is discharged into the atmosphere through a slot-like outlet nozzle or mouth 22 in the form of a finished foil. The width of this foil only depends upon the number of juxtaposed worm presses employed.

In the embodiment shown in Figure 4, the arrangement is identical to that shown in Fig. 3 except that the lower half of the press body 23 in the region of the outlet slot 24 is constituted by a rotatably mounted cylinder 25, over which a carrier band 27 of textile material is fed from a roller 26. Under the pressure of the cylinder 25, a combination or firm connection between the web of carrier material consisting, for example, of textile fabric, and the plastic material then takes place.

If two such pressing arrangements 28, 29 (see Figure 5) are simultaneously employed, the inclined end faces 30, 31 of which bound the outlet slot and which thus lie at an angle to one another, a web 32 of textile material from a supply roll 31 which is passed through the slot between the two arrangements, may be provided on both sides with the plastic mass or with a foil of any desired thickness. The thickness of the foil may in this case be regulated as desired by adjusting the width of the gap 33 by means of a spindle drive 34.

If it is desired to reinforce an extruded foil on both sides with a carrier, of for example a strip of textile material, the arrangement shown in Figure 6 may advantageously be employed, in which the outlet slot is bounded on both sides by cylinders 35, 36. The starting material taken up by a worm 37 from a charging hopper 38 is forced, after thorough mixing and plasticisation, through a slot-like nozzle 39, equalising chamber 40 and an outlet nozzle 43 into the space between the two textile strips 44 and 45 travelling over the cylinders 35 and 36 and is taken up by the said strips, so that the two strips of textile material are united by a foil of synthetic material situated therebetween.

I claim:

1. In an extrusion device, in combination, a die formed with a plurality of extrusion conduits extending in an extruding direction and being arranged spaced from each other in a direction transverse to said extruding direction, said extrusion conduits having outlet portions widening in said transverse direction and being constricted in a direction perpendicular to said extruding direction and said transverse direction and ending in narrow elongated outlet slots being in end to end relationship with the adjacent outlet slots so as to form together a narrow elongated nozzle slot extending in said transverse direction across said extrusion conduits, said extrusion die being formed with at least one elongated pressure chamber extending in said transverse direction and communicating at one side thereof with said nozzle slot, said pressure chamber being wider in said perpendicular direction than said nozzle slot and being gradually constricted toward the other side thereof so as to form a narrow elongated extrusion slot extending in said transverse direction whereby bands of plastic material extruded through said outlet portions spread in said transverse direction when passing through said outlet slots into said pressure chamber to engage adjacent extruded bands and to combine with the same to be extruded as a foil through said extrusion slot.

2. In an extrusion device, in combination, a die formed with a plurality of extrusion conduits extending in an extruding direction and being arranged spaced from each other in a direction transverse to said extruding direction, said extrusion conduits having outlet portions widening in said transverse direction and being constricted in a direction perpendicular to said extruding direction and said transverse direction and ending in narrow elongated outlet slots being in end to end relationship with the adjacent outlet slots so as to form together a narrow elongated nozzle slot extending in said transverse direction across said extrusion conduits; a plurality of extruding piston members arranged in said extrusion conduits movable in said extruding direction for extruding a plastic material through said outlet slots; piston rod means connected to said extruding piston members and projecting out of said extrusion conduits in a direction opposite to said extruding direction; and a crank shaft extending in said transverse direction and having a plurality of angularly spaced crank portions, each of said crank portions being connected to one of said piston rod means for consecutively actuating said extruding piston members during rotation of said crank shaft.

3. In an extrusion device, in combination, a die formed with a plurality of extrusion conduits extending in an extruding direction and being arranged spaced from each other in a direction transverse to said extruding direction, said extrusion conduits having outlet portions widening in said transverse direction and being constricted in a direction perpendicular to said extruding direction and said transverse direction and ending in narrow elongated outlet slots being in end to end relationship with the adjacent outlet slots so as to form together a narrow elongated nozzle slot extending in said transverse direction across said extrusion conduits, said extrusion die being formed with at least one elongated pressure chamber extending in said transverse direction and communicating at one side thereof with said nozzle slot, said pressure chamber being wider in said perpendicular direction than said nozzle slot and being gradually constricted toward the other side thereof so as to form a narrow elongated extrusion slot extending in said transverse direction whereby bands of plastic material extruded through said outlet portions spread in said transverse direction when passing through said outlet slots into said pressure chamber to engage adjacent extruded bands and to combine with the same to be extruded as a foil through said extrusion slot; a plurality of extruding piston members arranged in said extrusion conduits movable in said extruding direction for extruding a plastic material through said outlet slots; piston rod means connected to said extruding piston members and projecting out of said extrusion conduits in a direction opposite to said extruding direction; and a crank shaft extending in said transverse direction and having a plurality of angularly spaced crank portions, each of said crank portions being connected to one of said piston rod means for consecutively actuating said extruding piston members during rotation of said crank shaft.

4. An extrusion die as claimed in claim 1 formed with another narrow elongated extrusion slot extending in said transverse direction, and further formed with another pressure chamber being wider in said perpendicular direction than said extrusion slot and being located intermediate said extrusion slots.

References Cited in the file of this patent

UNITED STATES PATENTS

| Number | Name | Date |
| --- | --- | --- |
| 1,679,545 | Roth | Aug. 7, 1928 |
| 1,768,671 | Devine | July 1, 1930 |
| 1,918,127 | Pfeiffer | July 11, 1933 |
| 2,174,779 | Delorme | Oct. 3, 1939 |
| 2,181,987 | Beaver et al. | Dec. 5, 1939 |
| 2,366,417 | MacMillin | Jan. 2, 1945 |
| 2,485,523 | Ashbaugh | Oct. 18, 1949 |
| 2,624,914 | Rhodes | Jan. 13, 1953 |

FOREIGN PATENTS

| Number | Country | Date |
| --- | --- | --- |
| 981,373 | France | Jan. 10, 1951 |